May 27, 1924.　　　　　C. JOANNIDES　　　　　1,495,486
MANUFACTURE OF DENTAL PLATES
Filed Dec. 13, 1920
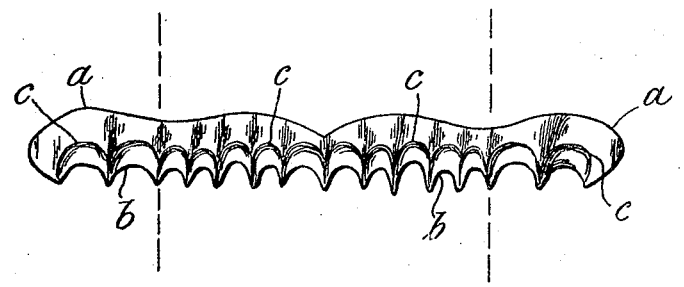
Inventor
Christe Joannides.
per C. Barnard Purdon
Attorney.

Patented May 27, 1924.

1,495,486

UNITED STATES PATENT OFFICE.

CHRISTE JOANNIDES, OF CONSTANTINOPLE, TURKEY.

MANUFACTURE OF DENTAL PLATES.

Application filed December 13, 1920. Serial No. 430,572.

*To all whom it may concern:*

Be it known that I, CHRISTE JOANNIDES, a citizen of the French Republic, of 36 Place l'Ambassade d'Angleterre, Constantinople, Turkey, at present residing at the Regent Palace Hotel, London, W. 1, England, have invented certain new and useful Improvements in or Relating to the Manufacture of Dental Plates, of which the following is a specification.

This invention has reference to the manufacture of dental plates and relates more particularly to the artificial gum portion thereof.

According to this invention the pink rubber portion constituting the artificial gum is manufactured in the form of a ready made strip with the edge scalloped, festooned or otherwise suitably shaped. The strip facing is prepared in various sizes according to requirements as to the shape and form of the teeth and ready for use by the dentists.

The scalloped or festooned strip facings may be made of pink rubber or may consist of any pliable or plastic composition suitable for imitation gum, or may be mixed or prepared with different strengthening or stiffening material or materials.

The strip facings are prepared with their edges scalloped, festooned or otherwise suitably shaped to correspond to the spaces between the teeth and formed to match or substantially match the contour at the necks of the teeth. To further match the natural shape of the gum the strips have a ridged surface so prepared as to correspond to the swelling or fullness of the natural gums.

These ready made strips give substantially a uniform thickness of pink rubber compared with the usual method of packing in small pieces which requires more rubber and gives uneven thickness and often leads to displacement by the base rubber. The difficulty of curving the artificial gum in order to match the natural form is thus overcome, as such curving not only requires considerable skill upon the part of the operator, but there is the risk of exposing the base rubber forming the plate owing to the uneven thickness of the pink rubber portion, which being of a different colour than the gum portion, depreciates the value of the plate. The strips may also be so prepared of such a thickness as to permit the base rubber to be packed or injected behind, thus securing uniform thickness owing to the absence of break of continuity, and producing a lighter and stronger plate than usually, whilst the plate will be of a more natural appearance.

The said facings being pliable or plastic allow their adaptation to correspond with the respective parts of the teeth.

An example of a ready made strip is shown in the accompanying drawings in which $a$ is the body of the strip, $b$ the recessed or scalloped portion to match the spaces between and at the neck of the teeth, and $c$ are the raised portions or ridges just as in the natural gums.

These strips may be formed either by dies or by pattern rollers or otherwise.

The ready made strips may be made to suit a complete set of teeth or the end portions outside the dotted lines corresponding to the back molar teeth may be omitted as this does not interfere with the natural appearance of the plate when in use, or it may be made to comprise as many teeth as desired or may be cut up to the desired part when required for use.

The strip facings may be covered with any suitable linen or its equivalent but a much better result can be obtained if the outer portion of the strip is covered with tin foil or the like which will obtain a glazed or smooth surface of the facing after vulcanization than if the facing was in direct contact with the plaster.

It is preferable to apply the strips (especially those having a ridged surface) before the flasking operation as a much better result is obtained as is described in my co-pending application No. 430,571.

Obviously the invention may be modified in various ways in carrying same into practice without departing from the general nature thereof.

I claim:—

1. An artificial gum in the form of a strip with scalloped edge ready to be applied to the teeth.

2. An artificial gum in the form of a strip of pink rubber with scalloped edge ready to be applied to the teeth.

3. An artificial gum in the form of a strip of plastic or pliable composition with festooned or scalloped edge ready to be applied to the teeth and conforming to the shape of the teeth.

4. A ready made artificial gum in the form of a strip with scalloped edge and a ridged surface.

5. In the manufacture of a dental plate, securing the teeth in their relative position by means of wax, applying to the thus secured teeth a strip of artificial gum with a festooned edge, and thereafter placing said teeth with said strip attached thereto into a mould of plaster and finishing the plate.

In testimony whereof I affix my signature.

CHRISTE JOANNIDES.